US009257052B2

(12) United States Patent
Rapp et al.

(10) Patent No.: US 9,257,052 B2
(45) Date of Patent: Feb. 9, 2016

(54) EVALUATING CANDIDATE ANSWERS TO QUESTIONS IN A TARGET KNOWLEDGE DOMAIN

(75) Inventors: William C. Rapp, Rochester, MN (US); Richard J. Stevens, Rochester, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/592,640

(22) Filed: Aug. 23, 2012

(65) Prior Publication Data

US 2014/0057241 A1    Feb. 27, 2014

(51) Int. Cl.
*G06F 15/00* (2006.01)
*G06F 15/18* (2006.01)
*G09B 7/02* (2006.01)

(52) U.S. Cl.
CPC ........................................ *G09B 7/02* (2013.01)

(58) Field of Classification Search
CPC .......... G06F 17/30395; G06F 17/3041; G06F 17/30654; G06F 15/00; G06F 15/18; G06N 99/00
USPC ........................................................ 434/353
See application file for complete search history.

(56) References Cited

U.S. PATENT DOCUMENTS

| | | | |
|---|---|---|---|
| 6,678,669 B2* | 1/2004 | Lapointe et al. ................. 706/15 |
| 7,627,489 B2 | 12/2009 | Schaeffer et al. | |
| 2002/0107452 A1 | 8/2002 | Kwong | |
| 2003/0130836 A1* | 7/2003 | Chang et al. ....................... 704/8 |
| 2004/0063085 A1* | 4/2004 | Ivanir et al. .................... 434/322 |
| 2004/0137413 A1* | 7/2004 | Yamamoto et al. ........... 434/236 |
| 2005/0234878 A1* | 10/2005 | Dettinger et al. .................. 707/3 |
| 2008/0275731 A1 | 11/2008 | Rao et al. | |
| 2008/0319800 A1 | 12/2008 | Schaeffer et al. | |
| 2009/0070137 A1 | 3/2009 | Haider et al. | |
| 2010/0082363 A1* | 4/2010 | Warner et al. ...................... 705/2 |
| 2010/0094657 A1* | 4/2010 | Stern et al. ......................... 705/3 |
| 2011/0021883 A1 | 1/2011 | Young et al. | |

(Continued)

OTHER PUBLICATIONS

Alonso et al., "Combining Expert Knowledge and Data Mining in a Medical Diagnosis Domain", Expert systems with Applications, Nov. 2002, pp. 367-375, vol. 23, Issue 4, Elsevier Science Ltd., published online, Digital Object Identifier: 10.1016/S0957-4174(02)00072-6.

(Continued)

*Primary Examiner* — Kakali Chaki
*Assistant Examiner* — Peter Coughlan
(74) *Attorney, Agent, or Firm* — Edward J. Lenart; Grant A. Johnson; Kennedy Lenart Spraggins LLP

(57) ABSTRACT

Evaluating candidate answers to questions in a target knowledge domain, including: identifying, by a question answering module, a plurality of evidence items in the target knowledge domain; identifying, by the question answering module, a plurality of answers to questions in the target knowledge domain; determining, by the question answering module, associations between each evidence item and one or more of the answers; receiving, by the question answering module, a question; receiving, by the question answering module, values for the one or more evidence items; and providing, by the question answering module, an answer to the question in dependence upon the associations between each evidence item and one or more of the answers and the values for the one or more evidence items.

15 Claims, 4 Drawing Sheets

(56) References Cited

U.S. PATENT DOCUMENTS

2011/0078192 A1* 3/2011 Murdock, IV .............. 707/780
2011/0213625 A1* 9/2011 Joao ................................ 705/3
2012/0084092 A1* 4/2012 Kozuch et al. .................. 705/2
2013/0181832 A1* 7/2013 Landau et al. .......... 340/539.12

OTHER PUBLICATIONS

Huang et al., "Integrating Data Mining With Case-Based Reasoning for Chronic Diseases Prognosis and Diagnosis", Expert Systems with Applications, Apr. 2007, pp. 856-867, vol. 32, Issue 3, Elsevier, USA, Digital Object Identifier: 10.1016/j.eswa.2006.01.038.

Cios et al., "Uniqueness of Medical Data Mining", accessed Apr. 12, 2012, 24 pages, URL: https://docs.google.com/viewer?a=v&q=cache:k06Jtw3CPOUJ:citeseerx.ist.psu.edu/viewdoc/download?doi%3D10.1.1.16.5229%26rep%3Drep1%26type%3Dpdf-+uniqueness+of+medical+data+mining&hl=en&gl=us&pid=bl&srcid=ADGEESjltySs1zDYBPeBDq7XkCK3tC-8uNOFrS9FL__mAv68Wi9c396vWgLBgHF6PirczjQY9r__kd2LcJpCnui9__ESYBFVyyR7ARBbbnUisCaB9JuNkWPK8__E6Q9UqW0W4RqXbeeDBx0&sig=AHIEtbTBPjBt8KJCDIPHcnXTv4eW0kjQeg.

* cited by examiner

EVALUATING CANDIDATE ANSWERS TO QUESTIONS IN A TARGET KNOWLEDGE DOMAIN

BACKGROUND OF THE INVENTION

1. Field of the Invention

The field of the invention is data processing, or, more specifically, methods, apparatus, and products for evaluating candidate answers to questions in a target knowledge domain.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As modern computing systems have advanced, potential uses for such computing systems have also advanced. One area of such advancement is in the field of artificial intelligence. Artificial intelligence technologies attempt to simulate the human capacity to learn and perform various functions typically carried out by human beings.

SUMMARY OF THE INVENTION

Methods, apparatus, and products for evaluating candidate answers to questions in a target knowledge domain, including: identifying, by a question answering module, a plurality of evidence items in the target knowledge domain; identifying, by the question answering module, a plurality of answers to questions in the target knowledge domain; determining, by the question answering module, associations between each evidence item and one or more of the answers; receiving, by the question answering module, a question; receiving, by the question answering module, values for the one or more evidence items; and providing, by the question answering module, an answer to the question in dependence upon the associations between each evidence item and one or more of the answers and the values for the one or more evidence items.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
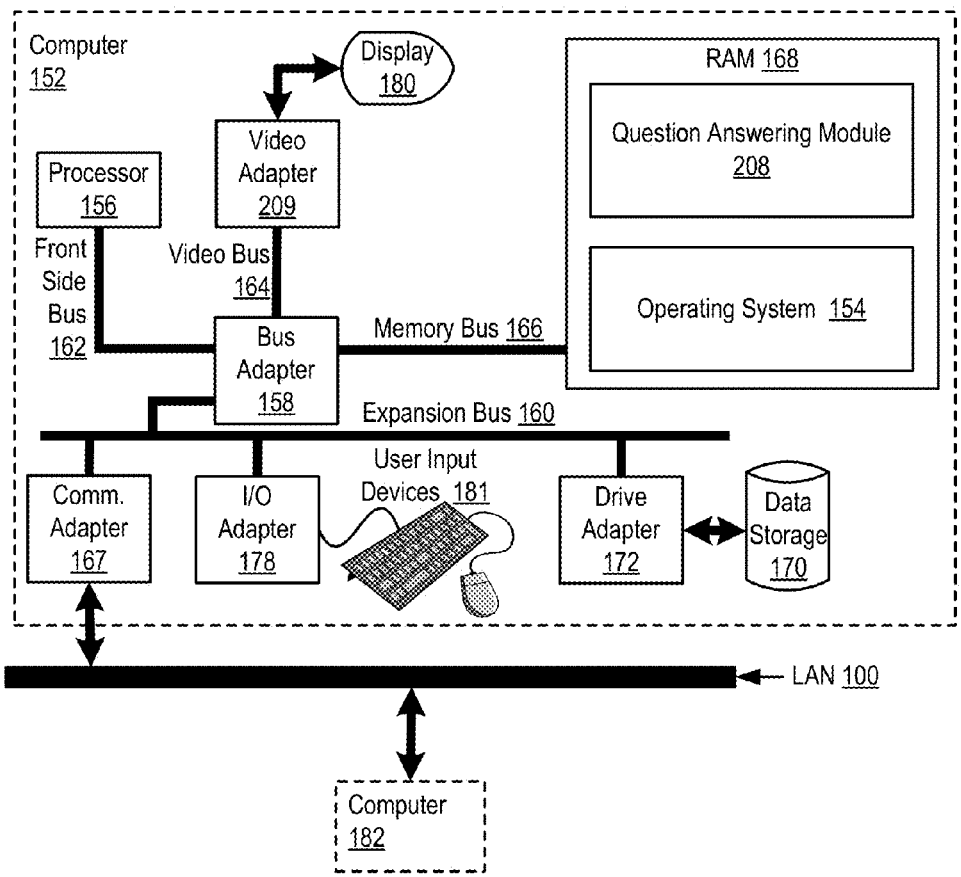
FIG. 1 sets forth a block diagram of automated computing machinery comprising an example computer useful in evaluating candidate answers to questions in a target knowledge domain according to embodiments of the present invention.

Example methods, apparatus, and products for evaluating candidate answers to questions in a target knowledge domain in accordance with the present invention are described with reference to the accompanying drawings, beginning with FIG. 1. FIG. 1 sets forth a block diagram of automated computing machinery comprising an example computer (152) useful in evaluating candidate answers to questions in a target knowledge domain according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a question answering module (208), a module of computer program instructions improved for evaluating candidate answers to questions in a target knowledge domain according to embodiments of the present invention. A target knowledge domain represents a general category of subject matter. For example, one target knowledge domain may be characterized as a 'health diagnosis' target knowledge domain in which the questions are directed to diagnosing symptoms of a patient and providing answers to questions (e.g., Do I have cancer?) that can be posed by the patient. Another target knowledge domain may be characterized as a 'stock picking' target knowledge domain in which the questions are directed to analyzing the expected future value of stocks and providing answers to questions (e.g., Should I buy shares of stock issued by Company X?) that can be posed by a user (204).

The question answering module (208) of FIG. 1 evaluates candidate answers to questions in a target knowledge domain by processing one or more information sources associated with a target knowledge domain. The one or more information sources associated with a target knowledge domain may be embodied, for example, as unstructured documents such as a white paper, textbook, news article, encyclopedia entry, and so on. Alternatively, the one or more information sources associated with a target knowledge domain may also be embodied as more structured data sources such as, for example, a database, a structured document that include tags, pair-value entries, and so on. The one or more information sources included information related to the target knowledge domain. For example, if the target knowledge domain is a 'health diagnosis' target knowledge domain as described above, the one or more information sources may include articles from medical journals, medical textbooks, and the like.

The question answering module (208) of FIG. 1 processes one or more information sources associated with a target knowledge domain, for example, by applying natural language processing techniques, statistical answer scoring techniques, and machine learning techniques that analyze the one or more information sources to gain an understanding of the content contained within the one or more information sources. Such techniques may take into account the frequency with which a particular piece of evidence (e.g., high blood pressure) it cited in the context of a given answer (e.g., the patient has heart disease), whether there are any language modifiers such as a negation modifier in which a given piece of evidence is cited in the context of a given answer, and other information to extract information from the one or more information sources to form a knowledge base.

The question answering module (208) of FIG. 1 further evaluates candidate answers to questions in a target knowledge domain by identifying a plurality of evidence items in the target knowledge domain. An evidence item represents a piece of information that tends to support or contradict a particular answer to a question. For example, if the target knowledge domain is a 'health diagnosis' target knowledge domain as described above, the weight of patient and the height of a patient may serve as evidence items with respect to the question of "am I clinically obese?" As such, the weight of patient represents an evidence item and the height of the patient represents another evidence item.

The question answering module (208) of FIG. 1 identifies a plurality of evidence items in the target knowledge domain by identifying quantifiable pieces of information associated with the target knowledge domain. The evidence items may be quantifiable in the sense that an absolute value can be measured for the evidence item. For example, a 'heart rate' evidence item can have a measured value expressed in terms of heart beats per unit of time. Alternatively, the evidence items may be quantifiable in the sense the evidence item can be expressed in terms of being absent or present. For example, a 'chest pain' evidence item can be associated with a value indicating that chest pain was experienced by a patient or associated with a different value indicating that chest pain was not experienced by the patient.

The question answering module (208) of FIG. 1 further evaluates candidate answers to questions in a target knowledge domain by identifying a plurality of answers to questions in the target knowledge domain. The particular set of answers to questions in the target knowledge domain will depend in large part on the nature of the target knowledge domain. For example, if the target knowledge domain is a 'health diagnosis' target knowledge domain as described above, the particular set of available answers may include all known diseases as each disease may represent a candidate answer to a question such as "what disease do I have?" Likewise, the particular set of available answers may include all known symptoms for each disease as each symptom may represent a candidate answer to a question such as "what are the symptoms of a stroke?"

The question answering module (208) of FIG. 1 further evaluates candidate answers to questions in a target knowledge domain by determining associations between each evidence item and one or more of the answers. An association between an evidence item and a particular answer arises when the evidence item, including a value associated with an evidence item, tends to support or contradict a particular answer. For example, if the target knowledge domain is a 'health diagnosis' target knowledge domain as described above, evidence items such as blood pressure, body mass index, and age may be associated with answers of "the patient likely has heart disease" or "the patient does not have heart disease." In such an example, an association can exist between these evidence items and these answers if the values associated with the evidence items tend to support or contradict each answer to the question of "does the patient have heart disease?" The question answering module (208) of FIG. 1 determines associations between each evidence item and one or more of the answers, for example, through the use of natural language processing techniques, machine learning techniques, and the like.

The question answering module (208) of FIG. 1 further evaluates candidate answers to questions in a target knowledge domain by receiving a question. The question may be received via a user-interface for providing a user with access to the question answering module. Alternatively, the question may be received from another automated process. The question may be selected from a list of available questions, derived from user input through the use of natural language processing techniques, and so on.

The question answering module (208) of FIG. 1 further evaluates candidate answers to questions in a target knowledge domain by receiving values for the one or more evidence items. The question answering module (208) of FIG. 1 may receive values for the one or more evidence items, for example, by receiving the values from the user via a graphical user interface to the question answering module (208). Alternatively, receiving values for the one or more evidence items may be carried out by receiving the values from an automated process or device communicatively coupled to the question answering monitor (208). For example, if the target knowledge domain is a 'health diagnosis' target knowledge domain as described above, the question answering module (208) may be coupled to medical devices such as a heart rate monitor, scale, and so on via a data communications network. In such an example, the medical device may be configured to automatically transmit all measured data to the question answering module (208) as a value for one or more evidence items.

The question answering module (208) of FIG. 1 further evaluates candidate answers to questions in a target knowledge domain by providing an answer to the question in dependence upon the associations between each evidence item and one or more of the answers and the values for the one or more evidence items. Providing an answer to the question in dependence upon the associations between each evidence item and one or more of the answers and the values for the one or more evidence items may be carried out, for example, by calculating a score for each possible answer and presenting the answer with the highest score, presenting the answers with scores above a predetermined threshold, presenting the a predetermined number of the top candidate answers, and so on.

Consider an example in which the target knowledge domain is a 'health diagnosis' target knowledge domain and the question is "which diseases might I have?" In such an example, the candidate set of answers would be the list of all known diseases. Because each answer is associated with one more evidence item, the value of each known evidence item can be used to determine the likelihood that a particular candidate answer is the proper answer to the question. For example, if the values for the one or more evidence items include the blood pressure of a patient, the gender of the patient, the height of the patient, and the weight of the patient, these values can compared to the associations between each evidence item and one or more of the answers to determine the most likely answer. For example, if the value associated with a 'gender' evidence item indicates that the patient is male, an answer of 'ovarian cancer' would be eliminated based on the association between a 'gender' evidence item and the candidate answer.

Also stored in RAM (168) is an operating system (154). Operating systems useful evaluating candidate answers to questions in a target knowledge domain according to embodiments of the present invention include UNIX™, Linux™, Microsoft XP™, AIX™, IBM's i5/OS™, and others as will occur to those of skill in the art. The operating system (154) and question answering module (208) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for evaluating candidate answers to questions in a target knowledge domain according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for evaluating candidate answers to questions in a target knowledge domain according to embodiments of the present invention include modems for wired dial-up communications, Ethernet (IEEE 802.3) adapters for wired data communications network communications, and 802.11 adapters for wireless data communications network communications.

Figure 2:
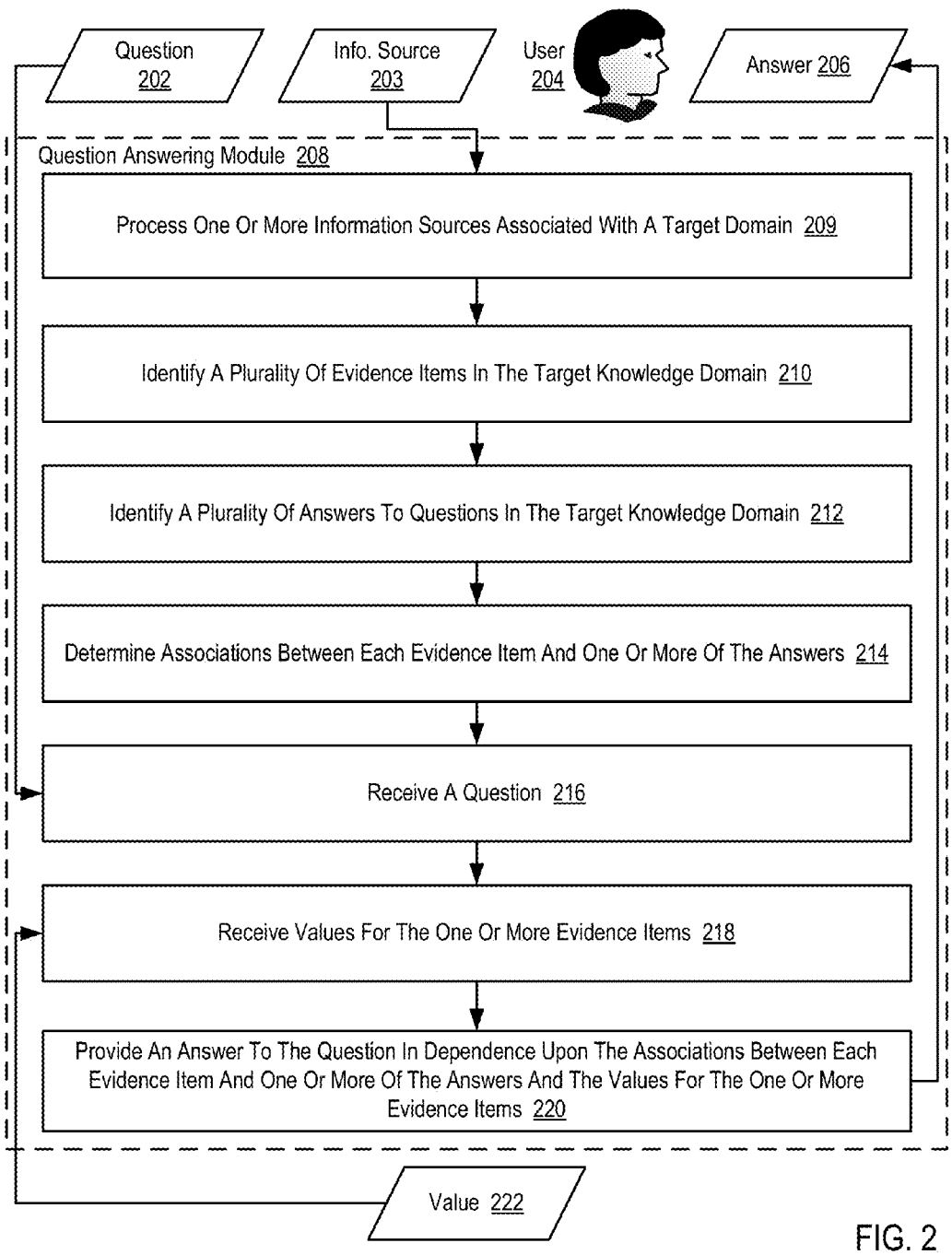
FIG. 2 sets forth a flow chart illustrating an example method for evaluating candidate answers to questions in a target knowledge domain according to embodiments of the present invention.

For further explanation, FIG. 2 sets forth a flow chart illustrating an example method for evaluating candidate answers to questions in a target knowledge domain according to embodiments of the present invention. In the example method of FIG. 2, a target knowledge domain represents a general category of subject matter. For example, one target knowledge domain may be characterized as a 'health diagnosis' target knowledge domain in which the questions are directed to diagnosing symptoms of a patient and providing answers to questions (e.g., Do I have cancer?) that can be posed by the patient. Another target knowledge domain may be characterized as a 'stock picking' target knowledge domain in which the questions are directed to analyzing the expected future value of stocks and providing answers to questions (e.g., Should I buy shares of stock issued by Company X?) that can be posed by a user (204). In the example method of FIG. 2, evaluating candidate answers to questions in a target knowledge domain is carried out by a question answering module (208). The question answering module (208) of FIG. 2 represents a module of computer program instructions executing on computer hardware.

The example method of FIG. 2 includes processing (209), by the question answering module (208), one or more information sources (203) associated with a target knowledge domain. In the example method of FIG. 2, the one or more information sources (203) associated with a target knowledge domain may be embodied, for example, as unstructured documents such as a white paper, textbook, news article, encyclopedia entry, and so on. Alternatively, the one or more information sources (203) associated with a target knowledge domain may also be embodied as more structured data sources such as, for example, a database, a structured document that include tags, pair-value entries, and so on. The one or more information sources (203) included information related to the target knowledge domain. For example, if the target knowledge domain is a 'health diagnosis' target knowledge domain as described above, the one or more information sources (203) may include articles from medical journals, medical textbooks, and the like.

In the example method of FIG. 2, processing (209), by the question answering module (208), one or more information sources (203) associated with a target knowledge domain may be carried out, for example, by applying natural language processing techniques, statistical answer scoring techniques, and machine learning techniques that analyze the one or more information sources (203) to gain an understanding of the content contained within the one or more information sources (203). Such techniques may take into account the frequency with which a particular piece of evidence (e.g., high blood pressure) it cited in the context of a given answer (e.g., the patient has heart disease), whether there are any language modifiers such as a negation modifier in which a given piece of evidence is cited in the context of a given answer, and other information to extract information from the one or more information sources (203) to form a knowledge base.

The example method of FIG. 2 includes identifying (210), by the question answering module (208), a plurality of evidence items in the target knowledge domain. In the example method of FIG. 2, an evidence item represents a piece of information that tends to support or contradict a particular answer to a question. For example, if the target knowledge domain is a 'health diagnosis' target knowledge domain as described above, the weight of patient and the height of a patient may serve as evidence items with respect to the question of "am I clinically obese?" As such, the weight of patient represents an evidence item and the height of the patient represents another evidence item.

In the example method of FIG. 2, identifying (210) a plurality of evidence items in the target knowledge domain may be carried out, for example, by identifying quantifiable pieces of information associated with the target knowledge domain. The evidence items may be quantifiable in the sense that an absolute value can be measured for the evidence item. For example, a 'heart rate' evidence item can have a measured value expressed in terms of heart beats per unit of time. Alternatively, the evidence items may be quantifiable in the sense the evidence item can be expressed in terms of being absent or present. For example, a 'chest pain' evidence item can be associated with a value indicating that chest pain was experienced by a patient or associated with a different value indicating that chest pain was not experienced by the patient.

The example method of FIG. 2 includes identifying (212), by a question answering module (208), a plurality of answers to questions in the target knowledge domain. In the example method of FIG. 2, the particular set of answers to questions in the target knowledge domain will depend in large part on the nature of the target knowledge domain. For example, if the target knowledge domain is a 'health diagnosis' target knowledge domain as described above, the particular set of available answers may include all known diseases as each disease may represent a candidate answer to a question such as "what disease do I have?" Likewise, the particular set of available answers may include all known symptoms for each disease as each symptom may represent a candidate answer to a question such as "what are the symptoms of a stroke?"

The example method of FIG. 2 includes determining (214), by the question answering module (208), associations between each evidence item and one or more of the answers. In the example method of FIG. 2, an association between an evidence item and a particular answer arises when the evidence item, including a value associated with an evidence item, tends to support or contradict a particular answer. For example, if the target knowledge domain is a 'health diagnosis' target knowledge domain as described above, evidence items such as blood pressure, body mass index, and age may be associated with answers of "the patient likely has heart disease" or "the patient does not have heart disease." In such an example, an association can exist between these evidence items and these answers if the values associated with the evidence items tend to support or contradict each answer to the question of "does the patient have heart disease?"

In the example method of FIG. 2, determining (214) associations between each evidence item and one or more of the answers may be carried out, for example, through the use of natural language processing techniques, machine learning techniques, and the like. Consider an example in which the following passage is contained in an article from a medical journal that is used as an information source (203) to the question answering module (208):

Heart disease can frequently be caused by high blood pressure and an excessive body mass index. Studies suggest, however, that age is not a factor in a patient's likelihood to suffer from heart disease. Studies also indicate that regular exercise reduces the chance of contracting heart disease.

In this example, the question answering module (208) may use natural language processing techniques to identify keys pieces of information discussed in the first sentence, such as "heart disease," "blood pressure," and "body mass index." Modifiers contained in the first sentence further indicate that "high" blood pressure and "excessive" body mass index are in some way associated with heart disease in the context of the subject sentence. The phrase "caused by" provides insight into the relationship between these three pieces of information, as there is a positive relationship between "heart disease," "high blood pressure," and "excessive body mass index." As such, after analyzing this piece of information the question answering module (208) can determine an association in which high blood pressure and excessive body mass index are positively correlated with heart disease, such that the presence of high blood pressure and excessive body mass index in a patient's profile make it more likely that the patient has heart disease.

The question answering module (208) may further use natural language processing techniques to identify keys pieces of information discussed in the second sentence, such as "heart disease" and "age." A modifier contained in the second sentence further indicates that "old" age is in some way associated with heart disease in the context of the subject sentence. The phrase "is not a factor" provides insight into the relationship between these two pieces of information, as an inconsequential relationship between "heart disease" and "old age" is described in the sentence. As such, after analyzing this piece of information the question answering module (208) can determine that there is no need to associate heart disease with old age, such that the presence or absence of old age in a patient's profile has no bearing on the likelihood that the patient has heart disease.

The question answering module (208) may further use natural language processing techniques to identify keys pieces of information discussed in the third sentence, such as "heart disease" and "exercise." A modifier contained in the third sentence further indicates that "regular" exercise is in some way associated with heart disease in the context of the subject sentence. The phrase "reduces the chance of contracting" provides insight into the relationship between these two pieces of information, as a negative relationship between "heart disease" and "exercise" is described in the sentence. As such, after analyzing this piece of information the question answering module (208) can determine an association in which regular exercise and heart disease are negatively correlated, such that the presence of regular exercise in a patient's profile makes it less likely that the patient has heart disease.

In embodiments of the present invention, the correlation between a particular evidence item and an answer may be accumulated through analysis of many documents, articles, text books, and so on. Evidence items that are positively correlated with an answer consistently across the entire corpus of information are assigned a higher level of correlation than evidence items which are not consistently found to be correlated with that same answer.

The example method of FIG. 2 includes receiving (216), by the question answering module (208), a question (202). In the example method of FIG. 2, the question (202) may be received (216) via a user-interface for providing a user (204) with access to the question answering module (208). Alternatively, the question (202) may be received (216) from another automated process. The question (202) may be selected from a list of available questions, derived from user input through the use of natural language processing techniques, and so on.

The example method of FIG. 2 includes receiving (218), by the question answering module (208), values (222) for the one or more evidence items. In the example method of FIG. 2, receiving (218) values (222) for the one or more evidence items may be carried out, for example, by receiving the values from the user (204) via a graphical user interface to the question answering module (208). Alternatively, receiving (218) values (222) for the one or more evidence items may be carried out by receiving the values (222) from an automated process or device communicatively coupled to the question answering monitor (208). For example, if the target knowledge domain is a 'health diagnosis' target knowledge domain as described above, the question answering module (208) may be coupled to medical devices such as a heart rate monitor, scale, and so on via a data communications network. In such an example, the medical device may be configured to automatically transmit all measured data to the question answering module (208) as a value (222) for one or more evidence items. A value (222) for one or more evidence items may be received by extracting such values, using natural language processing techniques, from the unstructured text representing question and background information provided by the patient such as, for example, the patient's medical history.

The example method of FIG. 2 includes providing (220), by the question answering module (208), an answer (206) to the question in dependence upon the associations between each evidence item and one or more of the answers and the values (222) for the one or more evidence items. In the example method of FIG. 2, providing (220) an answer (206) to the question in dependence upon the associations between each evidence item and one or more of the answers and the values (222) for the one or more evidence items may be carried out, for example, by calculating a score for each possible answer and presenting the answer with the highest score, presenting the answers with scores above a predetermined threshold, presenting the a predetermined number of the top candidate answers, and so on.

Consider an example in which the target knowledge domain is a 'health diagnosis' target knowledge domain and the question is "which diseases might I have?" In such an example, the candidate set of answers would be the list of all known diseases. Because each answer is associated with one more evidence item, the value (222) of each known evidence item can be used to determine the likelihood that a particular candidate answer is the proper answer to the question. For example, if the values (222) for the one or more evidence items include the blood pressure of a patient, the gender of the patient, the height of the patient, and the weight of the patient, these values can compared to the associations between each evidence item and one or more of the answers to determine the most likely answer. For example, if the value associated with a 'gender' evidence item indicates that the patient is male, an answer of 'ovarian cancer' would be eliminated based on the association between a 'gender' evidence item and the candidate answer.

Figure 3:
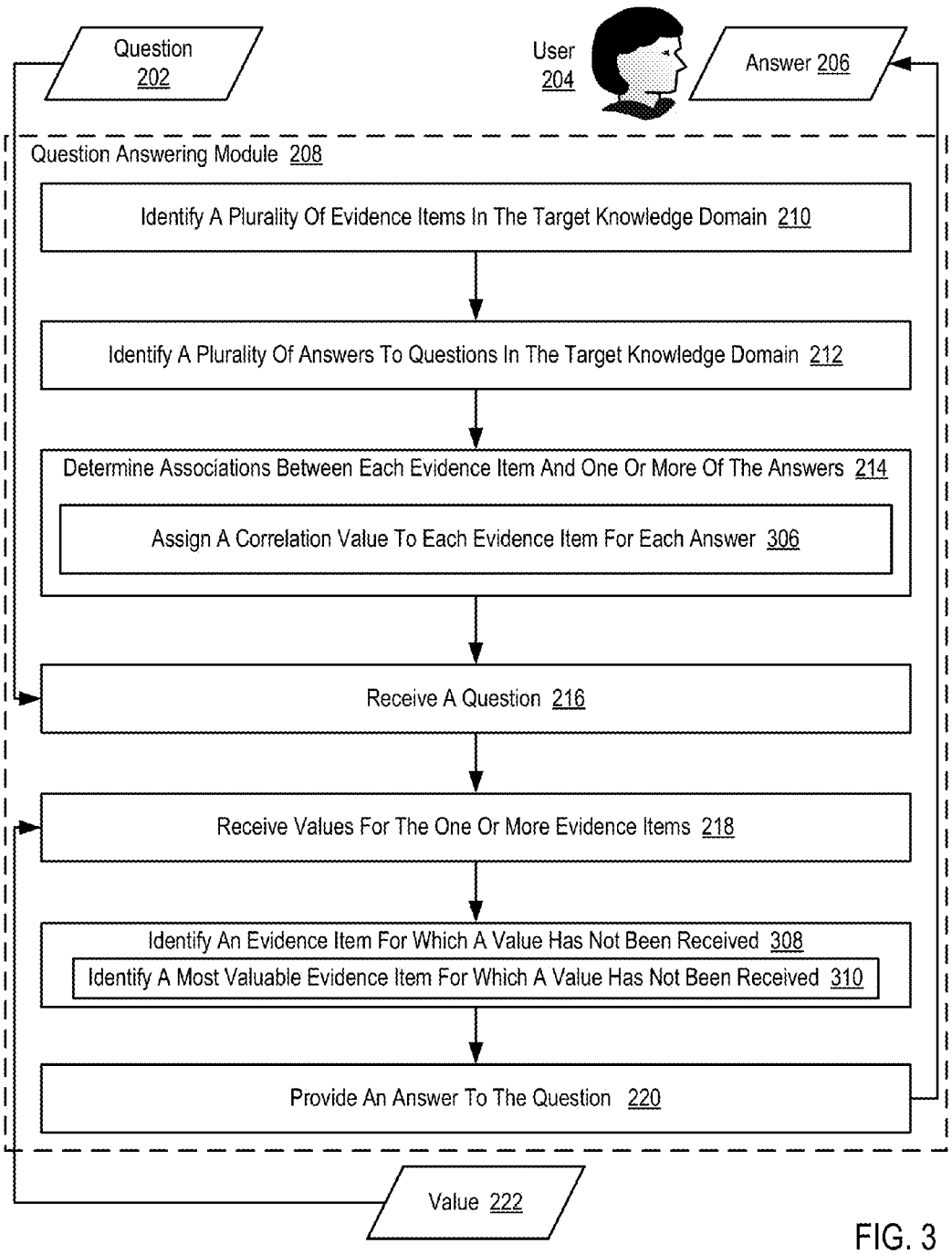
FIG. 3 sets forth a flow chart illustrating a further example method for evaluating candidate answers to questions in a target knowledge domain according to embodiments of the present invention.

For further explanation, FIG. 3 sets forth a flow chart illustrating a further example method for evaluating candidate answers to questions in a target knowledge domain according to embodiments of the present invention. The example method of FIG. 3 is similar to the example method of FIG. 2 as it also includes identifying (210) a plurality of evidence items in the target knowledge domain, identifying (212) a plurality of answers to questions in the target knowledge domain, determining (214) associations between each evidence item and one or more of the answers, receiving (216) a question (202), receiving (218) values (222) for the one or more evidence items, and providing (220) an answer (206) to the question in dependence upon the associations between each evidence item and one or more of the answers and the values (222) for the one or more evidence items.

In the example method of FIG. 3, determining (214) associations between each evidence item and one or more of the answers includes assigning (306) a correlation value to each evidence item for each answer. In the example method of FIG. 3, a correlation value is an indicator of the strength of correlation between a particular evidence item and an answer. Consider the example described above in which a candidate answer in a 'health diagnosis' target knowledge domain is 'ovarian cancer' and an associated evidence item is a 'gender' evidence item. In such an example, the correlation value for the 'gender' evidence item would be very high with respect to an answer of 'ovarian cancer' as 100% of all cases of ovarian cancer are found in women. The same evidence item, however, may have a low correlation value for an answer of 'lung cancer' as lung cancer can be found in men and women. As such, gender is a far better predictor for determining that a patient has ovarian cancer while it may be less helpful in determining that a patient has lung cancer.

The example method of FIG. 3 also includes identifying (308), by the question answering module (208), an evidence item for which a value has not been received. As described above, each candidate answer is associated with one or more evidence items. Identifying (308) an evidence item for which a value has not been received can therefore be carried out by determining which evidence items are related to a particular candidate answer determining which evidence items that a value (222) has been received for, and determining the difference between the two sets of evidence items. Evidence items for which a value has not been received may subsequently be requested from a user (204) of the question answering module (208), requested from a process or device communicatively coupled to the question answering module (208), and so on.

In the example method of FIG. 3, identifying (308) an evidence item for which a value has not been received can include identifying (310), by the question answering module (208), a most valuable evidence item for which a value has not been received. A particular evidence item may be a most valuable evidence item, for example, based on the correlation values assigned to each evidence item. The evidence item with the highest correlation value would represent the most critical piece of missing information. As such, the question answering module (208) may utilize the correlation values assigned to a particular evidence item to identify those missing evidence items that are most critical to correctly determining an answer.

Figure 4:
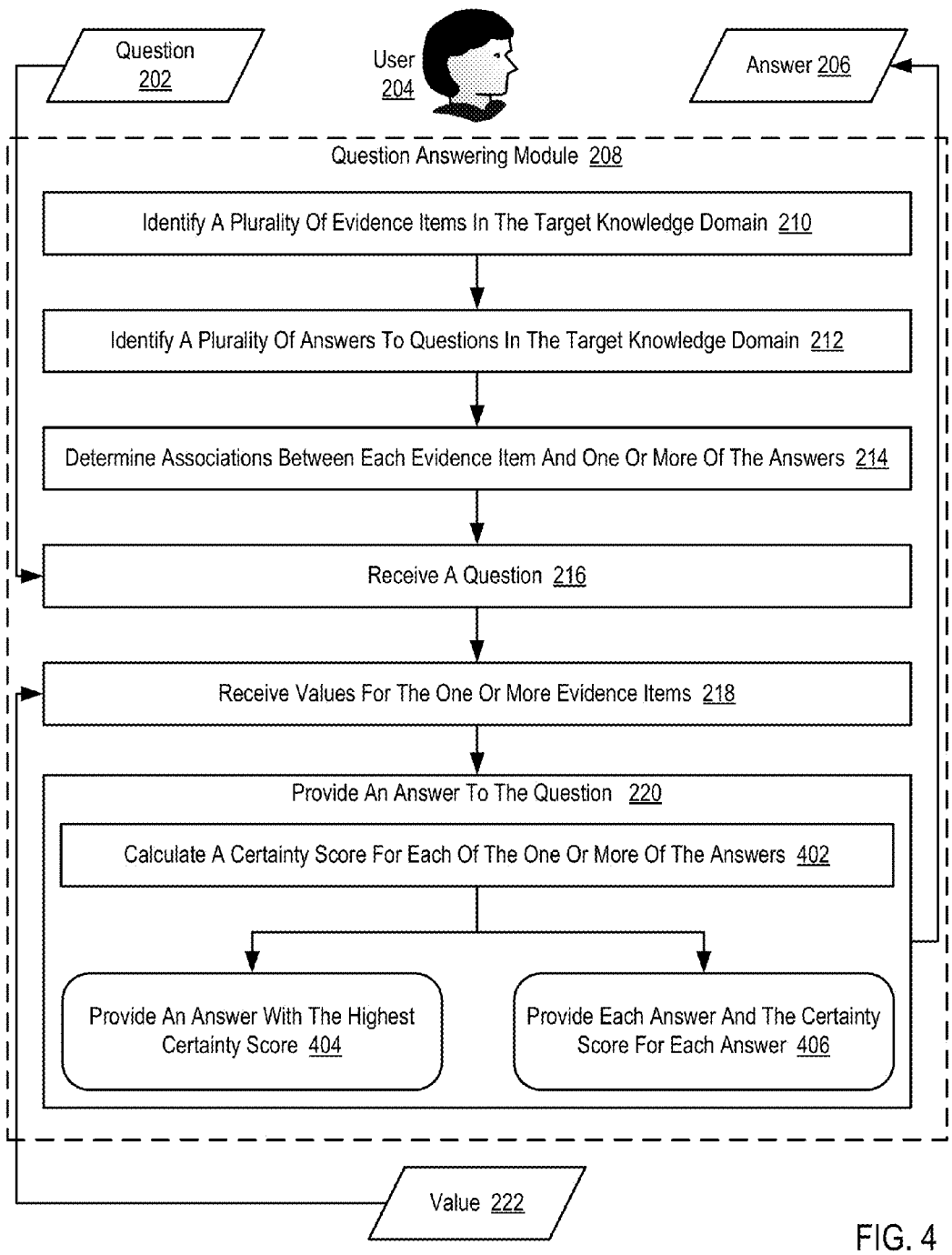
FIG. 4 sets forth a flow chart illustrating a further example method for evaluating candidate answers to questions in a target knowledge domain according to embodiments of the present invention.

For further explanation, FIG. 4 sets forth a flow chart illustrating a further example method for evaluating candidate answers to questions in a target knowledge domain according to embodiments of the present invention. The example method of FIG. 4 is similar to the example method of FIG. 2 as it also includes identifying (210) a plurality of evidence items in the target knowledge domain, identifying (212) a plurality of answers to questions in the target knowledge domain, determining (214) associations between each evidence item and one or more of the answers, receiving (216) a question (202), receiving (218) values (222) for the one or more evidence items, and providing (220) an answer (206) to the question in dependence upon the associations between each evidence item and one or more of the answers and the values (222) for the one or more evidence items.

In the example method of FIG. 4, providing (220) an answer (206) to the question further comprises calculating (402) a certainty score for each of the one or more of the answers. The certainty score of FIG. 4 represents a confidence level that a particular answer is correct. Consider an example in which the question is "am I obese?" Assume in this example that the only two evidence items are associated with answers of 'yes' and 'no' are a 'height' evidence item and a 'weight' evidence item, each of which is weighted equally. In such an example, when values for both evidence items are received, the certainty score would be 100% as all necessary pieces of evidence have been received. Alternatively, if only one value was received the confidence score would be lower. In the example method of FIG. 4, calculating (402) a certainty score for each of the one or more of the answers may be carried out, for example, by calculating the percentage of received evidence items that are associated with a particular answer. In such an example, the question answering module (208) can not only calculate the percentage of received evidence items that are associated with a particular answer, but the question answering module (208) may also adjusting the weighting of each evidence item in dependence upon correlation values between the evidence item and a particular answer. For example, if a particular answer is associated with two evidence items that have different correlation values, receiving only a value associated with the more critical evidence item could result in a higher certainty score for a particular answer than would be achieved after receiving only a value associated with the less critical evidence item, in spite of the fact that in each situation values were received for the same percentage of associated evidence items.

In the example method of FIG. 4, providing (404) an answer (206) to the question (202) can include providing (404) an answer with the highest certainty score. In such an example, the user (204) would therefore be presented with the answer (206) that the question answering module (208) has determined to be the most likely answer. Alternatively, providing (404) an answer (206) to the question (202) can include providing (406) each answer (206) and the certainty score for each answer (206). In such an example, the user (204) would therefore be presented with multiple answers (206) as well as the question answering module (208) determination as to how likely each answer is to be the best answer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of evaluating candidate answers to questions in a target knowledge domain, the method comprising:
   identifying, by a question answering module, a plurality of evidence items in the target knowledge domain;
   identifying, by the question answering module, a plurality of answers to questions in the target knowledge domain;
   determining, by the question answering module, associations between an evidence item and one or more of the answers including forming an association based at least in part on a value associated with an evidence item supporting or contradicting an answer to a question; and
   assigning a correlation value for an association between a particular evidence item and a particular answer to a particular question, the correlation value indicating a strength with which the particular item supports or contradicts the particular answer to the particular question:
   identifying, by the question answering module, an evidence item for which a value has not been received, and identifying, by the question answering module, a most valuable evidence item for which a value has not been received based at least in part on the most valuable evidence item having a highest correlation value of the associations between the plurality of evidence items and the answers to the questions;
   receiving, by the question answering module from a user, a question
   receiving, by the question answering module, values for the one or more evidence items; and
   providing, by the question answering module, an answer to the question in dependence upon the associations between each evidence item and one or more of the answers and the values for the one or more evidence items.

2. The method of claim 1 further comprising processing, by the question answering module, one or more information sources associated with a target knowledge domain.

3. The method of claim 1 wherein providing, by the question answering module, an answer to the question further comprises calculating a certainty score for each of the one or more of the answers.

4. The method of claim 3 wherein providing, by the question answering module, an answer to the question further comprises providing an answer with the highest certainty score.

5. The method of claim 3 wherein providing, by the question answering module, an answer to the question further comprises providing each answer and the certainty score for each answer.

6. An apparatus for evaluating candidate answers to questions in a target knowledge domain, the apparatus comprising a computer processor, a computer memory operatively coupled to the computer processor, the computer memory including computer program instructions that, when executed by the computer processor, cause the apparatus to perform operations comprising:
   identifying, by a question answering module, a plurality of evidence items in the target knowledge domain;
   identifying, by the question answering module, a plurality of answers to questions in the target knowledge domain;
   determining, by the question answering module, associations between each evidence item and one or more of the answers forming an association based at least in part on a value associated with an evidence item supports or contradicts an answer to a question; and
   assigning a correlation value for an association between a particular evidence item and a particular answer to a particular question, the correlation value indicating a strength with which the particular evidence item supports or contradicts the particular answer to the particular question;
   identifying, by the question answering module, an evidence item for which a value has not been received, and identifying, by the question answering module, a most valuable evidence item for which a value has not been received based at least in part on the most valuable evidence item having a highest correlation value of the associations between the plurality of evidence items and the answers to the questions;
   receiving, by the question answering module from a user, a question;
   receiving, by the question answering module, values for the one or more evidence items; and
   providing, by the question answering module, an answer to the question in dependence upon the associations between each evidence item and one or more of the answers and the values for the one or more evidence items.

7. The apparatus of claim 6 further comprising computer program instructions that, when executed by the computer processor, cause the apparatus to perform an operation comprising processing, by the question answering module, one or more information sources associated with a target knowledge domain.

8. The apparatus of claim 6 wherein providing, by the question answering module, an answer to the question further comprises calculating a certainty score for each of the one or more of the answers.

9. The apparatus of claim 8 wherein providing, by the question answering module, an answer to the question further comprises providing an answer with the highest certainty score.

10. The apparatus of claim 8 wherein providing, by the question answering module, an answer to the question further comprises providing each answer and the certainty score for each answer.

11. A computer program product for evaluating candidate answers to questions in a target knowledge domain, the computer program product including a computer readable medium, wherein the computer readable medium is not a signal, the computer program product comprising computer program instructions that, when executed, cause a computer to perform operations comprising:
   identifying, by a question answering module, a plurality of evidence items in the target knowledge domain;
   identifying, by the question answering module, a plurality of answers to questions in the target knowledge domain;
   determining, by the question answering module, associations between an evidence item and one or more of the answers forming an association based at least in part on a value associated with an evidence item supporting or contradicting an answer to a question; and assigning a correlation value for an association between a particular evidence item and a particular answer to a particular question, the correlation value indicating a strength with which the particular evidence item supports or contradicts the particular answer to the particular question;

identifying, by the question answering module, an evidence item for which a value has not been received, and identifying, by the question answering module, a most valuable evidence item for which a value has not been received based at least in part on the most valuable evidence item having a highest correlation value of the associations between the plurality of evidence items and the answers to the questions;

receiving, by the question answering module from a user, a question;

receiving, by the question answering module, values for the one or more evidence items; and providing, by the question answering module, an answer to the question in dependence upon the associations between each evidence item and one or more of the answers and the values for the one or more evidence items.

12. The computer program product of claim 11 further comprising computer program instructions that, when executed, cause the computer to perform an operation comprising processing, by the question answering module, one or more information sources associated with a target knowledge domain.

13. The computer program product of claim 11 wherein providing, by the question answering module, an answer to the question further comprises calculating a certainty score for each of the one or more of the answers.

14. The computer program product of claim 13 wherein providing, by the question answering module, an answer to the question further comprises providing an answer with the highest certainty score.

15. The computer program product of claim 13 wherein providing, by the question answering module, an answer to the question further comprises providing each answer and the certainty score for each answer.

* * * * *